United States Patent [19]

Massie

[11] 3,883,533

[45] May 13, 1975

[54] PROCESS FOR PREPARING 1,4-DIAZABICYCLO OCTANE

[75] Inventor: Stephen N. Massie, Palatine, Ill.

[73] Assignee: Universal Oil Products Company, Des Plaines, Ill.

[22] Filed: Dec. 27, 1973

[21] Appl. No.: 428,645

[52] U.S. Cl.... 260/268 T; 260/268 SY; 260/248 R; 260/248.5; 260/250 B; 260/251 R; 260/293.55; 260/308 R; 260/309.7; 260/327; 260/333

[51] Int. Cl............................................. C07d 51/70

[58] Field of Search ................... 260/268 T, 268 SY

Primary Examiner—Donald G. Daus
Assistant Examiner—Jose Tovar
Attorney, Agent, or Firm—James R. Hoatson, Jr.; Raymond H. Nelson; William H. Page, II

[57] ABSTRACT

A polyheterocyclic amine having a nitrogen in the bridgehead position is prepared from the reaction of an N-polycarboxyl-substituted polyheterocyclic amine with an alkane polyol.

4 Claims, No Drawings

PROCESS FOR PREPARING 1,4-DIAZABICYCLO OCTANE

This invention relates to a process for preparing a polyheterocyclic amine. More specifically, this invention relates to a process for the preparation of a polyheterocyclic amine having a nitrogen in the bridgehead position from the reaction of a N-polycarboxyl-substituted polyheterocyclic amine with an alkane polyol.

The prior art has shown different processes for the production of a polyheterocyclic amine having a nitrogen in the bridgehead position, said polyheterocyclic amine commonly referred to as a triethylenediamine. One such method known to the art is the production of triethylenediamine by the reaction of an N-haloalkyl derivative of piperazine hydrohalides over silica-alumina catalyst at about 240°C to about 250°C. A second process known to the art for the production of the triethylenediamine is the vapor phase cyclization of aliphatic amines over acidic silica-alumina catalyst at a temperature of about 355°C and subsequent separation of the desired product from any byproducts or piperazine compounds formed in the cyclization. A third method known to the art for the production of the polyheterocyclic amine having a nitrogen in the bridgehead position such as 1,4-diazabicyclo[2.2.2]octane is the catalytic vapor phase reaction of an aliphatic amine with a silica-alumina coprecipitate as a catalyst, said reaction being effected at a temperature of from about 275°C to about 350°C at ordinary or subambient pressure. In this third process it is found that the formation of piperazine was reduced so as to avoid separation problems.

In contradistinction to the prior art it has now been found that a polyheterocyclic amine having a nitrogen in the bridgehead position may be prepared from the reaction of an N-polycarboxyl-substituted polyheterocyclic amine with an alkane polyol. The utilization of the above set forth invention will give the manufacturer of the said polyheterocyclic amine having a nitrogen in the bridgehead position a better economic control of the process as a result of the decrease in monetary expenditures and capitalization for heating and heat attainment equipment. The utilization of the above set forth invention will also allow the manufacturer of the polyheterocyclic amine having a nitrogen in the bridgehead position a more variable range of products as a result of a greater ability to utilize a larger number of charge stocks which are available to the manufacturer.

The desired products of this invention, namely, polyheterocyclic amines having a nitrogen in the bridgehead position, are utilized in the chemical industry in many ways. For example, 1,4-diazabicyclo[2.2.2]octane is utilized in the chemical industry as a catalyst for the production of polyurethane foams. Other polyheterocyclic amines having a nitrogen in the bridgehead position may also be utilized in the chemical industry as antioxidants and antiozonants.

It is therefore an object of this invention to provide a process for the preparation of a polyheterocyclic amine having a nitrogen in the bridgehead position.

A further object of this invention is to provide a process for the preparation of a polyheterocyclic amine having a nitrogen in the bridgehead position utilizing certain temperatures and pressures which will permit the recovery of the desired compound in a more pecuniarily rewarding manner.

In one aspect an embodiment of this invention resides in a process for the preparation of a polyheterocyclic amine having a nitrogen in the bridgehead position which comprises a reaction of polycarboxyl-substituted polyheterocyclic amine with an alkane polyol at reaction conditions and recovering the resultant polyheterocyclic amine having a nitrogen in the bridgehead position in both areas of the general embodiment.

A specific embodiment of this invention resides in a process for preparing 1,4-diazabicyclo[2.2.2]octane which comprises the reaction of 1,4-bis(formyl)piperazine with ethylene glycol, in a medium comprising mesitylene at a temperature of about 325°C and a pressure of about 100 atmospheres of a substantially inert gas such as nitrogen and recovering the resultant polyheterocyclic amine having a nitrogen in the bridgehead position, namely, 1,4-diazabicyclo[2.2.2]octane.

A second specific embodiment of this invention resides in a process for preparing a polyheterocyclic amine having a nitrogen in the bridgehead position which comprises the reaction of 1,4-bis(formyl)piperazine with ethylene glycol at a temperature of about 325°C and a pressure of 100 atmospheres of a substantially inert gas such as nitrogen, and recovering the resultant polyheterocyclic amine having a nitrogen in the bridgehead position, namely, 1,4-diazabicyclo[2.2.2]octane.

Other objects and embodiments will be found in the following further detailed description of the present invention.

As hereinbefore set forth the present invention is concerned with a process for preparing a polyheterocyclic amine having a nitrogen in the bridgehead position, said process being effected by reacting a polycarboxyl-substituted polyheterocyclic amine with an alkane polyol. The reaction is effected under reaction conditions which include an elevated temperature in the range of from about 200°C to about 400°C and preferably in a range of from about 250°C to about 350°C. In addition, another reaction condition involves pressure, said pressures ranging from atmospheric up to 200 atmospheres or more. When superatmospheric pressures are employed, said pressure is afforded by the introduction of a substantially inert gas such as nitrogen into the reaction zone or autoclave, said pressure may be afforded by an initial charge of pressure or a continuous stream of pressure from an inert gas reservoir. Another variable which is employed is the amount of reactants, the polycarboxyl-substituted polyheterocyclic amine being present in a mol ratio in the range of from about 1:1 up to about 2:1 mols of the polycarboxyl-substituted polyheterocyclic amine per mol of the alkane polyol compound.

Suitable examples of polycarboxylated-substituted polyheterocyclic amines which are utilized as one of the starting materials in the processes of this invention include, in particular, 1,3-bis(formyl)imidazole, 1,3-bis-(acetyl)imidazole, 1,3-bis(propionyl)imidazole, 1,2-bis(formyl)pyridiazine, 1,2-bis(acetyl)pyridiazine, 1,2-bis(propionyl)pyridazine, 1,3-bis(formyl)pyrimidine, 1,3-bis(acetyl)pyrimidine, 1,3-bis(propionyl)pyrimidine, 1,4-bis(formyl)-piperazine, 1,4-bis(acetyl)piperazine, 1,4-bis(propionyl)piperazine, 1,2-bis-(formyl)pyrazoline, 1,2-bis(acetyl)pyrazolidine, 1,3-bis(propionyl)imidazoline, 1,3-bis(formyl)imidazolidine, 1,3-bis(acetyl)-3,4,5,6-tetrahydropyrimidine, 1,3-bis(propionyl)perhydropyrimidine, 1,3,7,9-tetrakis(formyl)purine, etc.

Suitable alkane polyol compounds which may be reacted with the aforementioned polycarboxylated-substituted polyheterocyclic amine will include all alkane polyols having a carbon number range of from 2 carbon atoms to about 5 carbon atoms as exemplified by 1,2-dihydroxyethane, (commonly known as ethylene glycol), 1,2-dihydroxypropane, 1,3-dihydroxypropane 1,2,3trihydroxypropane (commonly known as glycerin), 1,2-dihydroxybutane, 1,3-dihydroxybutane, 1,2,3-trihydroxybutane, 1,2,3,4-tetrahydroxybutane, 1,2-dihydroxypentane, 1,2,3-trihydroxypentane, 1,4-dihydroxybut-2-ene, etc.

It is contemplated within the scope of this invention that the reaction may be effected in the presence of an inert organic media. Suitable examples of inert organic media would include 1,4-diisopropylbenzene, mesitylene(1,3,5-trimethylbenzene), pseudocumene(1,2,4-trimethylbenzene), hemimellitene(1,2,3-trimethylbenzene), cumene, toluene, benzene, pentane, heptane, octane, nonane, decane, etc.

It is understood that the aforementioned polycarboxylated-substituted polyheterocyclic amines, alkane polyol compounds and inert organic mediums are only representative of the class of compounds which may be employed and that the present invention is not necessarily limited thereto.

The process of this invention may be effected in any suitable manner and may comprise either a batch or a continuous type operation. For example, when a batch type operation is employed the reactants comprising the polycarboxyl-substituted polyheterocyclic amine and the alkane polyol are placed in an appropriate apparatus, said apparatus containing an inert organic media if one is so desired. If atmospheric pressure is to be employed, the reaction vessel is then heated to a predetermined operating pressure. After maintaining the reactants in the reaction vessel at the predetermined operating pressure. After maintaining the reactants in the reaction vessel at the predetermined temperature for a reaction time which may range from about 0.5 up to about 50 hours or more in duration, heating is discontinued and the vessel allowed to return to room temperature. The reaction mixture is then recovered and separated from the reaction media by conventional means of purification and separation, said means include washing, drying, extraction, evaporation, fractional distillation, etc., whereby the desired polyheterocyclic amine having a nitrogen in the bridgehead position is recovered. Alternatively, where superatmospheric pressures are to be employed in the reaction, the reactants are charged to a pressure vessel such as a rotating autoclave, said autoclave containing an inert organic media if one is so desired. The autoclave is sealed and a substantially inert gas such as nitrogen is pressed in until the desired operating pressure is reached. The autoclave is then heated to the desired operating temperature and maintained thereat for a predetermined residence time. At the end of this time heating is discontinued and the autoclave is allowed to return to room temperature and the excess pressure is discharged by a venting procedure. The autoclave is opened and the reaction mixture is then separated from the inert organic media in a manner similar to that hereinbefore set forth whereby the desired products, namely, the polyheterocyclic amines having a nitrogen in the bridgehead position, are separated and recovered.

It is also contemplated within the scope of this invention that the reaction process for obtaining a polyheterocyclic amine having a nitrogen in the bridgehead position may be effected in a continuous manner of operation. When such a type of operation is employed, the reactants comprising the polycarboxyl-substituted polyheterocyclic amine and the alkane polyol are continuously charged to the reaction vessel in any inert organic media, if such media is desired, said vessel being maintained at proper operating conditions of temperature and pressure. After completion of the desired residence time, the reactor effluent is continuously withdrawn and subjected to conventional means of separation whereby the desired polyheterocyclic amines having a nitrogen in the bridgehead position are recovered, while any unreacted starting materials comprising the polycarboxyl-substituted polyheterocyclic amine or any alkane polyol are recycled to the reaction zone to form a portion of the feedstock. If any inert organic media is recovered it also may be recycled to the reaction zone with fresh reactants.

Examples of polyheterocyclic amines having a nitrogen in the bridgehead position which may be prepared according to the process of this invention would include 4,5-triazabicyclo[3.2.2]nonane, 1,2,4-triazabicyclo[2.2.1]heptane, 7-thia-1,5-diazabicyclo[3.3.2]decane, 3-oxa-1,5-diazabicyclo[3.2.2]nonane, 1,5-diazabicyclo[3.3.1]nonane, 1,4-diazabicyclo[2.2.1]heptane, 1,4-diazabicyclo[2.2.1]hep-2-ene, 1,5-diazabicyclo[3.2.1]octane, 1,6-diazabicyclo[4.2.1]nonane, 1,5-diazabicyclo[4.3.1]decane, 1,6-diazatricyclo[5.3.1$^{4,11}$]dodecane, 1,7-diazatricyclo[6.3.1.0$^{4,11}$], 1,5-diazabicyclo[3.3.1]nonane, 1,7-diazatricyclo[5.3.1]dodecane, 1,6-diazabicyclo[5.2.1]-decane, 1,4-diazabicyclo[2.2.2]octane also known as triethylene diamine and DABCO and its oxo, hydroxy, halo and lower alkyl derivatives thereof; 1,3-diazadamatane, 1,3,5,7-tetrazabicyclo[3.3.1]nonane, also known as pentamethylenetetramine, 1,3,5,7-tetrazatricyclo[3.3.1.1$^{2,9}$]decane, also known as hexamethylenetetramine, etc. It is further understood that the aforementioned polyheterocyclic amines having a nitrogen in the bridgehead position are only representative of the class of compounds which may be prepared according to the above set forth invention and that the present invention is not necessarily limited thereto.

The following examples are given to illustrate the process of the present invention which, however, are not intended to limit the generally broad scope of the present invention in strict accordance therewith.

EXAMPLE I

In this example 14.2 grams (0.10 mol) of 1,4-bis(formyl)piperazine and 6.2 grams (0.1 mol) of ethylene glycol(dihydroxy ethane) were placed in an 850 ml glasslined rotating autoclave, said autoclave being provided with heating and pressure attainment devices. The autoclave was pressurized to a pressure of 100 atmospheres by the initial introduction of nitrogen gas and sealed to maintain the 100 atmospheres pressure. The autoclave was subsequently heated to a temperature of 325°C and maintained thereat while rotating for a period of time comprising 8 hours. At the end of the eight hour period of time, the heating was terminated and the autoclave vented, thereby allowing the autoclave to return to room temperature and ambient pressure. The product was removed from the autoclave by physical separation and analyzed by means of gas-liquid chromatography instrumentation, said analysis disclosed the product to contain 1,4-diazabicyclo[2.2.2]octane, a polyheterocyclic amine having nitrogen in both of the bridgehead positions.

EXAMPLE II

In this example 14.2 grams (0.10 mol) of 1,4-bis(formyl)piperazine and 6.2 grams(0.1 mols) of ethylene glycol(dihydroxy ethane) were placed in an 850 ml glasslined rotating autoclave, said autoclave being provided with heating and pressure attainment devices. The autoclave was pressurized to a pressure of 100 atmospheres by the initial introduction of nitrogen gas and sealed in order to maintain the 100 atmospheres pressure. The autoclave was subsequently heated to a temperature of 250°C and maintained thereat while rotating for a period of time comprising eight hours. At the end of the 8 hour period of time, the heating was terminated and the autoclave vented, thereby allowing the autoclave to return to room temperature and ambient pressure. The product was removed from the autoclave by physical separation and analyzed by means of gas-liquid chromotography instrumentation, said analysis disclosed the product to contain 1,4-diazabicyclo[2.2.2]octane, a polyheterocyclic amine having a nitrogen in the bridgehead position.

EXAMPLE III

In this example 14.2 grams (0.10 mols) of 1,4-bis(formyl(piperazine and 6.2 grams (0.1 mols) of ethylene glycol were placed in an 850 ml glasslined rotating autoclave, said autoclave being provided with heating and pressure attainment devices and containing 60.0 grams (0.5 mols) of mesitylene (1,3,5-trimethylbenzene) as an inert organic media. The autoclave was sealed and pressurized to 100 atmospheres by the initial introduction of nitrogen gas, and the autoclave was subsequently heated to a temperature of 325°C and maintained thereat while rotating for a period of time comprising 6 hours. At the end of the 6 hour period of time, the heating was terminated and the autoclave vented, thereby allowing the autoclave to return to room temperature and ambient pressure. The product was removed from the autoclave and, by physical separation, recovered from the inert organic media and analyzed by means of gas-liquid chromatography instrumentation, said analysis disclosed the product to contain 1,4-diazabicyclo[2.2.2]octane.

EXAMPLE IV

In this example 0.1 mols of 1,3-bis(acetyl)imidazoline and 0.1 mols of 1,3-propanediol are added to a 850 ml glasslined rotating autoclave provided with heating and pressure attainment devices, said autoclave containing 1,4-diisopropylbenzene as an inert organic media. The autoclave is sealed and pressurized to 50 atmospheres by the initial introduction of helium gas. The autoclave is subsequently heated to a temperature of 350°C and maintained thereat while rotating for a period of time comprising 12 hours. At the end of the 12 hour period of time, the heating is terminated and the autoclave is vented, thereby allowing the autoclave to return to room temperature and ambient pressure. The product is removed from the autoclave, and by physical separation, recovered from the inert organic media by filtration and analyzed by means of gas-liquid chromatography instrumentation, said analysis discloses the product to be 1,5-diazabicyclo[3.2.1]octan-6-ene a polyheterocyclic amine having a nitrogen in the bridgehead position.

I claim as my invention:

1. The process of reacting 1,4-bis(formyl)-piperazine with ethylene glycol at a temperature of from about 200°C. to about 400°C. and a pressure of from about atmospheric to about 200 atmospheres to produce 1,4-diazabicyclo[2.2.2]octane, and recovering the last-named compound.

2. The process of claim 1 further characterized in that the reaction is effected in the presence of an inert organic medium.

3. The process of claim 2 further characterized in that the inert organic medium is mesitylene.

4. The process of claim 2 further characterized in that the inert organic medium is 1,4-diisopropylbenzene.

* * * * *